United States Patent [19]

Shuey

[11] Patent Number: 4,668,934
[45] Date of Patent: May 26, 1987

[54] RECEIVER APPARATUS FOR THREE-PHASE POWER LINE CARRIER COMMUNICATIONS

[75] Inventor: Kenneth C. Shuey, Raleigh, N.C.
[73] Assignee: Westinghouse Electric Corp., Pittsburgh, Pa.
[21] Appl. No.: 663,251
[22] Filed: Oct. 22, 1984
[51] Int. Cl.[4] .......................................... H04M 11/04
[52] U.S. Cl. .............................. 340/310 A; 340/870.03
[58] Field of Search .......... 340/310 A, 310 R, 870.03, 340/870.02, 825.01, 825.44

[56] References Cited

U.S. PATENT DOCUMENTS

| | | |
|---|---|---|
| 3,911,415 | 10/1975 | Whyte . |
| 3,942,168 | 3/1976 | Whyte . |
| 3,967,264 | 6/1976 | Whyte et al. . |
| 4,215,394 | 7/1980 | Galloway et al. ............... 340/310 A |
| 4,311,964 | 1/1982 | Boykin . |
| 4,323,882 | 4/1982 | Gajjar . |
| 4,355,303 | 10/1982 | Phillips et al. . |
| 4,357,598 | 11/1982 | Melvin, Jr. ...................... 340/310 A |
| 4,378,533 | 3/1983 | Carnel ............................. 340/310 R |
| 4,379,284 | 4/1983 | Boykin . |
| 4,382,248 | 5/1983 | Pai . |
| 4,390,876 | 6/1983 | Bjorklund et al. .............. 340/310 A |
| 4,408,186 | 10/1983 | Howell ............................ 340/310 A |
| 4,422,071 | 12/1983 | de Graaf ......................... 340/825.44 |
| 4,427,968 | 1/1984 | York . |
| 4,473,816 | 9/1984 | Perkins ............................ 340/310 R |

Primary Examiner—Douglas W. Olms
Assistant Examiner—Curtis Kuntz
Attorney, Agent, or Firm—G. H. Telfer

[57] ABSTRACT

A transceiver is provided with both voltage and current coupling to a three phase transmission line system. Each phase conductor is coupled to a common point which is connected in signal communication with an input to a receiver. Another input of the receiver is coupled to the neutral conductor of the power line system by an H-field coupler. A signal coupling unit is associated with the voltage couplers between the common connection point and the first receiver input. The receiver is provided with the capability of comparing the voltage signal with the current signal and selecting the stronger of the two. Therefore, the transceiver of the present invention is less adversely affected by standing wave problems since the voltage and current signals are out of phase and voltage nodes are associated with current antinodes and vice versa. Therefore, regardless of the location along the standing wave that the transceiver is located, the best signal available will be used for demodulation purposes.

3 Claims, 6 Drawing Figures

RECEIVER APPARATUS FOR THREE-PHASE POWER LINE CARRIER COMMUNICATIONS

BACKGROUND AND SUMMARY OF THE INVENTION

The present invention relates generally to three-phase power line communication systems and, more particularly, to an apparatus that is coupled to a power line system to detect both voltage and current signals.

Power line communication systems utilize transmitters and receivers to communicate between remote stations that are connected in signal communication with the power line. Transmission of a message requires some form of modulation and a means for injecting the modulated signal onto the power line. Various types of modulation can be used in conjunction with a power line communication system. For example, phase shift keyed (PSK) modulation involves the use of a carrier signal with a constant frequency, such as 12.5 kilohertz, and a base band data message that is a binary representation of information. To provide a phase shift keyed modulated signal containing the base band data message, the carrier signal and the base band data signal are connected, as inputs, to an exclusive-OR device. The output of this exclusive-OR device, or modulator, is then amplified and injected onto the power line. Reception of a phase shift keyed modulated message from a power line communication system utilizes receiver circuitry that is capable of removing lower frequencies from the signal and then shaping the signal in such a way so as to be appropriate for demodulation. Typically, the incoming signal is passed through a high pass filter to remove the lower frequencies, such as the power transmission frequency of $\alpha$Hertz, and then it is hard limited in order to provide a generally square wave signal for input to a demodulator.

U.S. Pat. No. 3,911,415, which issued on Oct. 7, 1975 to Whyte, discloses a distribution network power line carrier communication system that can be used for linking individual power customers with a central station. Frequency translating and signal reconditioning repeaters are connected to intermediate locations of the network to relay carrier signals at different frequencies. U.S. Pat. No. 3,942,168, which issued on Mar. 2, 1976 to Whyte, discloses a distribution network power line communication system that includes a central communication terminal at a distribution substation. The central communication terminal is connected in signal communication with a plurality of remote communication terminals on the electrical distribution power lines. U.S. Pat. No. 4,357,598, which issued on Nov. 2, 1982 to Melvin, discloses a three-phase power distribution network communication system that comprises a plurality of remote devices, with certain of the remote devices being used as signal repeaters. The signal repeaters are each coupled to at least two of the three-phase conductors and each signal repeater includes circuitry for producing a composite signal in response to the coupled signals. U.S. Pat. No. 3,967,264, which issued on June 29, 1976 to Whyte et al., discloses a distribution network power line communication system that is divided into addressable communication zones defined by repeaters located at the distribution transformers of the distribution network. Each repeater is uniquely addressable by an interrogation signal. U.S. Pat. No. 4,427,968, which issued on Jan. 24, 1984 to York, discloses a distribution network communication system with flexible message routes. A plurality of signal repeaters are each connected with certain of the remote terminals through a distribution network and each signal repeater contains stored route and role codes as well as a unique address code allowing each signal repeater to be additionally addressed as an end device. U.S. Pat. Nos. 3,911,415; 3,942,168; 4,357,598; 3,967,264 and 4,427,968 are hereby incorporated by reference.

Various methods for injecting the modulated signal onto the power line are known to those skilled in the art. U.S. Pat. No. 4,323,882, which issued on Apr. 6, 1982 to Gajjar, discloses an apparatus for inserting carrier frequency signal information onto distribution transformer primary windings. Similarly, various types of receiver configurations for receiving signals from a power line communication system are known to those skilled in the art. U.S. Pat. No. 4,355,303, which issued on Oct. 19, 1982 to Phillips et al., discloses a receiver for use with a distribution network power line carrier communication system that is magnetically coupled to a distribution power line. It comprises a receiver amplification circuit that includes an automatic gain control circuit to prevent saturation of the receiver electronics along with a feedback circuit to determine the gain. U.S. Pat. No. 4,382,248, which issued on May 3, 1983 to Pai, discloses a remote device for a multi-phase power distribution network communication system. It includes a circuit for independently receiving each of the communication signals carried by the phase conductors of the power line system. The receiving circuit produces an input signal having a serial format in response to each of the received signals.

After signals are received from a power line communication system, the signals must be demodulated to interpret the messages contained therein. Depending on the particular type of modulation used, the modulators will vary significantly. If a phase shift keyed modulation system is utilized, various types of demodulators can be employed. U.S. Pat. No. 4,311,964, which issued on Jan. 19, 1982 to Boykin, discloses a coherent phase shift keyed demodulator for power line communication systems that comprises means for sequentially processing plus and minus polarity samples of plural carrier segments occurring within each carrier data symbol. These samples provide a binary coded signal for producing corresponding first and second relative phase angle vector signals which are summed over several data symbols to generate reference phase angle signal vector signals. U S. Pat. No. 4,379,284, which issued on Apr. 5, 1983 to Boykin, discloses an improved demodulator that is applicable to systems using phase shift keyed demodulation methods. U.S. Pat. Nos. 4,355,303; 4,382,248; 4,311,964 and 4,379,284 are hereby incorporated by reference.

Distribution power line carrier communication systems must be designed in such a way that they are able to communicate between remote devices under many different conditions and system configurations. The remote devices must be able to communicate properly in spite of many different types of propagation degradations that can occur within a power line network. Classical transmission line problems of impedance mismatch and standing waves are common within the complex physical layouts of distribution wiring systems. In a typical system, feeder circuits include various unterminated lengths which can cause conventional signal detection methods to be inadequate. Furthermore, besides the transmission attenuation and propagation problems, the distribution feeder system offers a background noise characteristic which is often difficult to predict. Typically, the worst noise problems on a system result from one or two sources of high power electronic industrial controls and this type of electrical noise tends to attenuate as the distance from the source is increased.

In power line transmission systems where classical standing wave characteristics are present, the voltage and current are out of phase. In typical receiver apparatus, couplers are used to detect voltage signals on at least two of the three phase conductors. U.S. Pat. No. 4,382,248 illustrates this method. U.S. Pat. No. 4,573,170, which issued on Feb. 25, 1986 to Melvin et al, discloses a time diversity carrier signal sampler that utilizes a shift register in conjunction with a timer and a plurality of phase samplers. It measures the instantaneous logic level of each phase signal on a time diversity basis in order to avoid the disadvantageous effects of noise pulses which can occur coincidentally on all three phases. The voltage signals are separately received from the three-phase conductors and processed by a sampling circuit which treats each of the signals individually to determine the best phase source for receiving the incoming message. If this type of apparatus is coupled to the power line at a point where a standing wave condition exists, the strength of the voltage signal will be dependent upon the precise location along the standing wave at which the receiver is coupled to the three-phase system. If the receiver is coupled at an antinode of the voltage signal, a strong signal will be available for reception. However, if the receiver system is connected to the power line at a voltage node, a very weak signal will be received and the proper operation of the receiver and demodulator will be severely jeopardized.

The present invention takes advantage of the fact that, in classical standing wave situations, the voltage and current signals are out of phase. If a receiver is coupled to the power line at a point where a voltage signal node occurs, a current signal antinode will exist at the same location. If a means is provided for receiving both current signals and voltage signals from the transmission line, the problems incumbent with standing wave situations can be avoided. Furthermore, if the voltage and current signals are compared to determine the strongest signal, the receiver could be equally effective regardless of the particular location along the standing wave it is located. The present invention provides a means for detecting both voltage and current signals and for providing those signals to a device capable of comparing the signals and selecting the stronger of the two.

The present invention relates generally to the need to sense both voltage and current signals at any particular physical location along transmission lines in order to combat classical standing wave problems. The present invention utilizes voltage coupling to each of the phase conductors of a three phase power line system along with current coupling to the neutral of the power line. It takes advantage of the fact that, in standing wave patterns, either the voltage or current can be depressed, but standing waves do not cause both signals to be depressed at the same physical location along the transmission line.

Each of the three phase conductors is coupled to a common point and that common point is connected in signal communication with an input to a receiver. The common connection of the three phase signals to a common point has the affect of creating a composite voltage signal that represents a combination of all three signals. A signal coupling unit is connected between the common connection point and the receiver input. The function of the signal coupling unit is to permit the 60 Hertz power line frequency to pass to ground while the frequency modulated signals pass to the receiver input. This portion of the present invention provides a single composite voltage signal received from the three phase conductors of the power line system.

An H-field coupler is operatively associated with the neutral conductor of the power line system. It utilizes a ferrite core with a plurality of turns around it. The core assembly is placed proximate the neutral conductor and provides a current signal to a second input of the receiver. The receiver therefore has two signal inputs to compare and select the strongest signal. If the apparatus is coupled to the power line at a location where the voltage signal is at a node, or null point, the current signal will be at an antinode point if a classical standing wave situation exists. Therefore, the receiver and related circuitry has two signals available to it. If the voltage signal is weak, the current signal will be strong and vice versa. Regardless of the specific location where the receiver circuitry is coupled to the transmission line, one of the two signals will be chosen based on their relative strengths and the likelihood of successful reception is enhanced.

In applications where the receiver circuitry must also be accompanied with signal transmission capability, the present invention utilizes the common point during transmissions. The output of a transmitter is connected in signal communication with the common point and modulated signals, which have been amplified, are injected onto the power line through the phase couplers connected between the phase conductors and the common point. Therefore, in situations where transceivers are required, the present invention provides both receiving and transmitting means.

BRIEF DESCRIPTION OF THE DRAWING

The present invention will be more fully understood from a reading of the description of the preferred embodiment of the present invention in conjunction with the drawing in which.

DESCRIPTION OF THE PREFERRED EMBODIMENT

Figure 1:
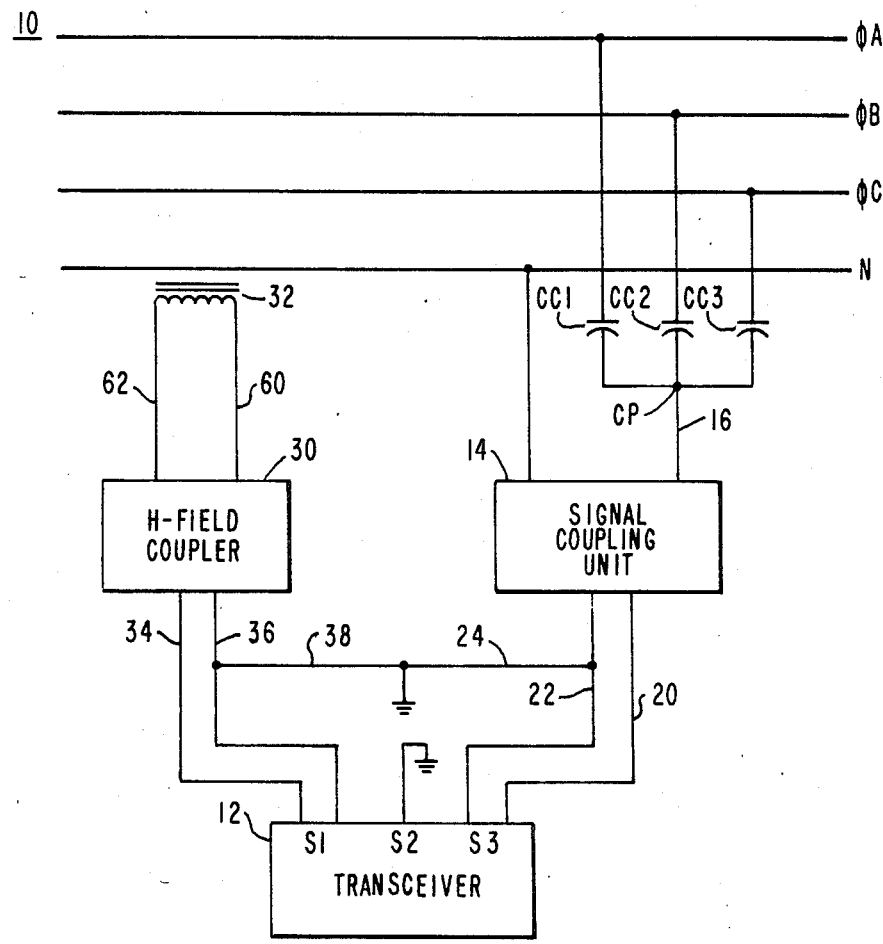
FIG. 1 illustrates the present invention operatively coupled to a three-phase power line system.

Throughout the description of the preferred embodiment, like elements will be described by like reference numerals in all of the Figures.

FIG. 1 illustrates a three-phase power line system 10. The present invention enables a transceiver 12 to be operatively coupled in signal communication with the power line system 10. The transceiver 12 can be included within a central communication unit (CCU), repeater or any other device that is coupled in signal communication to all of the phases of a three-phase power line for the purposes of incorporation into a power line communication system.

In FIG. 1, the transceiver 12 is illustrated as having three signal ports, S1, S2 and S3, through which modulated signals can be received by the transceiver prior to filtering and hard limiting. As described above, the power line communication signals are first filtered and then hard limited prior to demodulation of the incoming message.

When the transceiver 12 is provided with three input ports, S1, S2 and S3, it can be configured to choose the best of the three incoming signals in order to optimize the probability of properly receiving the incoming message which had been imposed on the three phases of the power line system by a remote transmitter.

The present invention utilizes a signal coupling unit 14, or SCU, for the purpose of coupling the transceiver to the three phases, $\phi A$, $\phi B$ and $\phi C$. In a preferred embodiment of the present invention, the three phases are each connected, by a coupling capacitor, to a common point CP. As illustrated in FIG. 1, coupling capacitor CC1 is connected in electrical communication between phase A and the common connection point CP. Similarly, a coupling capacitor CC2 is connected in electrical communication between phase B and the common point CP and a coupling capacitor CC3 is connected between phase C and the common point CP. By connecting the common point CP to an input of the signal coupling unit 14, the signal coupling unit receives a single composite voltage signal that is representative of the signals on each of the three phases of the power line system 10. It should be understood that the composite signal received by the signal coupling unit 14 will represent a signal that has a voltage level with a magnitude that is representative of the three signals on the power line system 10. The composite signal, received by the signal coupling unit 14 on line 16, will have a magnitude between the lowest and highest magnitudes of the three phase conductors of the power line system 10. As can be seen in FIG. 1, the signal coupling unit 14 is also connected to the neutral conductor of the three-phase power line system 10.

The signal coupling unit 14 is connected in signal communication with input S3 of the transceiver 12 by a coaxial cable having a central conductor 20 and a shield 22 that is connected to ground by line 24. When connected in this configuration, the transceiver 12 will receive a signal, on line 20, that is representative of the composite signal at connection point CP. The signal coupling unit 14 will be described in greater detail in conjunction with FIG. 3.

As illustrated in FIG. 1, the present invention can also utilize an H-field coupler 30 that is connected in signal communication with the neutral lead N of the power line communication system 10. The H-field coupler 30 utilizes a ferrite antenna 32 that is tuned to the frequency of the carrier signal to be received from the power line 10. As discussed above, in a typical application of a power line communication system suitable for use with the present invention, the carrier frequency is 12.5 khz. The output of the H-field coupler 30 is connected in signal communication with input S1 of the transceiver 12 by a coaxial cable which has a central conductor 34 and a shield 36 which is connected to ground by line 38. The H-field coupler 30 provides another input to the transceiver 12, as shown in FIG. 1, and enables the transceiver 12 to select the better of the two signals received at its inputs, S1 and S3. The signal received by input S1 is a current signal and the signal received by the input S3 is a voltage signal. If the transceiver 12 is provided with a third input, such as S2, it would be appropriately grounded in order to prevent extraneous electrical noise from interfering with the proper operation of the transceiver 12.

As can be seen in FIG. 1, the transceiver 12 is provided with both a current and a voltage signal. In situations where the power line system 10 is experiencing a standing wave phenomenon, this configuration of the present invention provides a higher probability of receiving signals of sufficient magnitude for proper demodulation. If, because of a standing wave, the voltage signal is extremely low at the point where the transceiver 12 is connected to the power line 10, the current signal will be high and the signal received by the H-field coupler 30 will provide an input signal with an acceptable magnitude for proper demodulation. If, conversely, the transceiver 12 is connected to the power line system 10 at a point where the current signal is extremely low, the voltage signal will be high and the signal coupling unit 14 will provide a voltage signal of sufficient magnitude for proper demodulation. Therefore, it can be seen that the configuration illustrated in FIG. 1 provides both a current and a voltage signal from the power line 10 and, in standing wave situations, greatly improves the probability of receiving a signal that has a sufficient magnitude for proper demodulation.

Figure 5:
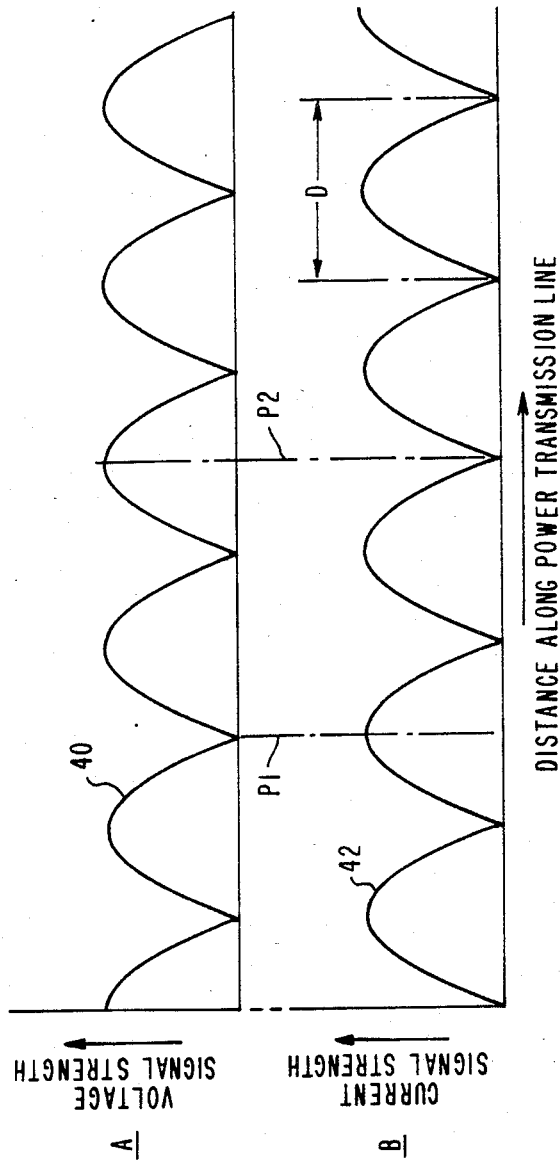
FIG. 5A is an illustration of the varying magnitudes of a voltage signal on a power line caused by a standing wave phenomenon.
FIG. 5B is an illustration of a varying current signal on a power line experiencing a standing wave phenomenon.

Referring momentarily to FIGS. 5A and 5B, the standing wave phenomenon is illustrated as a function of distance along a power line transmission line. For example, the voltage signal strength illustrated in FIG. 5 experiences sequential nodes and antinodes. At each node the voltage signal drops significantly and, in extreme cases, can approach zero signal strength. Conversely, the antinodes of the voltage signal are at a maximum magnitude midway between the nodes.

In FIG. 5B, the current signal strength is illustrated as a function of the distance along a power transmission line experiencing a standing wave phenomenon. As is known to those skilled in the art, when standing wave situations are experienced, the current and voltage signals will be out of phase such that the nodes of the voltage signal will occur at points along the power transmission line where antinodes of the current signal exists. For example, at point P1 along the power transmission line, the voltage signal is at a node and the current signal is at an antinode. Therefore, although point P1 represents a location at which it could be extremely difficult to receive an adequate voltage signal, the current signal is at a peak. The opposite condition exists at point P2 along the power transmission line. In a typical example of a standing wave condition, the distance D between nodes would be approximately 7.4 miles. Therefore, the distance between points P1 and P2 in FIGS. 5A and 5B would be approximately 11 miles.

By providing both voltage and current signals from the power transmission line, the present invention enables a transceiver to receive signals with sufficient magnitude regardless of the location of the transceiver along the power line. For example, if the transceiver 12 is connected to the power line at point P1, the voltage signal would be unacceptably low. However, at point P1, the current signal strength is at its peak and would provide a signal with sufficient magnitude to permit proper demodulation. Conversely, if the transceiver 12 was connected to the power line at point P2, the current signal strength is too low to permit proper receipt and demodulation of the current signal. However, at point P2, the voltage signal is at a peak and would permit the transceiver 12 to receive a signal with sufficient magnitude for proper demodulation.

Figure 6:
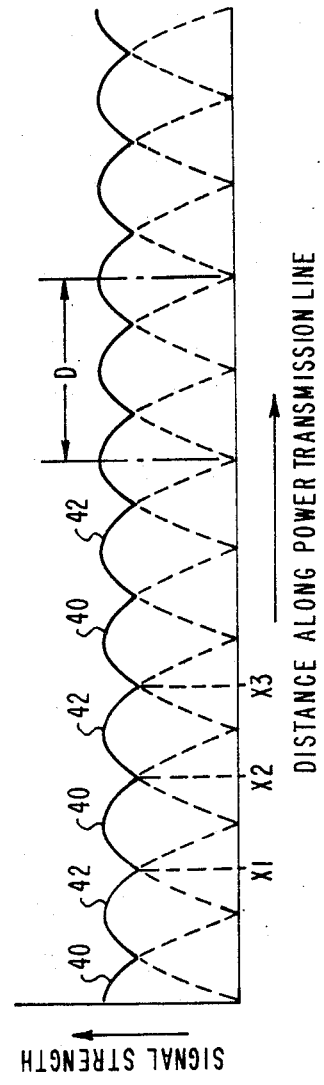
FIG. 6 illustrates both current and voltage signals on a power line exhibiting a standing wave phenomenon.

As discussed above, the present invention permits the transceiver 12 to receive both the current and voltage signals and, by various techniques known to those skilled in the art, select the stronger of the two signals for purposes of signal demodulation. FIG. 6 illustrates both the voltage signal 40 and the current signal 42 along a power transmission line experiencing a standing wave phenomenon. Since the transceiver 12 of the present invention can choose between both the current and voltage signals to select a signal with sufficient magnitude for demodulation, the solid line illustrated in FIG. 6 represents the signals that would be chosen by the transceiver logic. For example, between points X1 and X2, the voltage signal 40 is higher than the current signal 42. Therefore, the voltage signal received from the signal coupling unit 14 would have a higher magnitude than the current signal 42 received from the H-field coupler 30. However, between points X2 and X3, the current signal 42 would be higher than the voltage signal 40. Therefore, the signal received at input S1 of the transceiver 12 from the H-field coupler 30 would represent the stronger of the two signals and would be demodulated.

Figure 2:
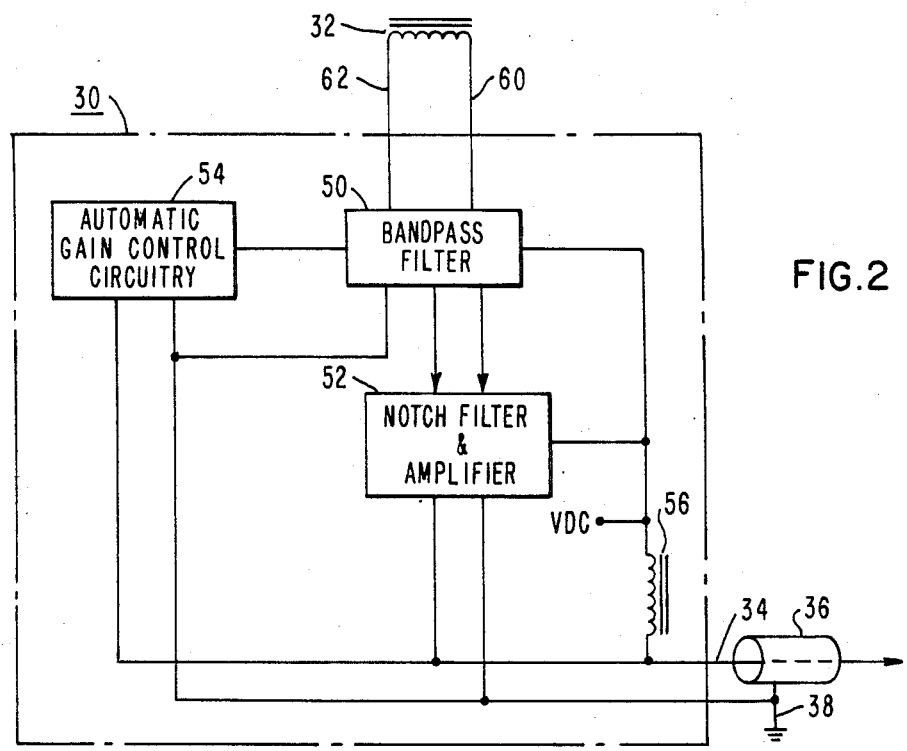
FIG. 2 is a simplified schematic diagram of an H-field coupler utilized in a preferred embodiment of the present invention.

FIG. 2 represents a simplified schematic of the H-field coupler 30 used in conjunction with the present invention. The ferrite antenna 32 is connected in signal communication with the bandpass filter 50 which, in turn, is connected in signal communication with a notch filter and amplifier circuit 52. The H-field coupler 30 is also provided with automatic gain control circuitry 54 and a high frequency isolation coil 56. A direct current voltage VDC is provided by a DC power supply (not illustrated in FIG. 2). The ferrite antenna 32 is connected to the input of the H-field coupler 30 by lines 60 and 62 and the output of the H-field coupler 30 is connected to the transceiver 12 by coaxial cable with a central conductor 34 and a grounded shield 36.

Figure 3:
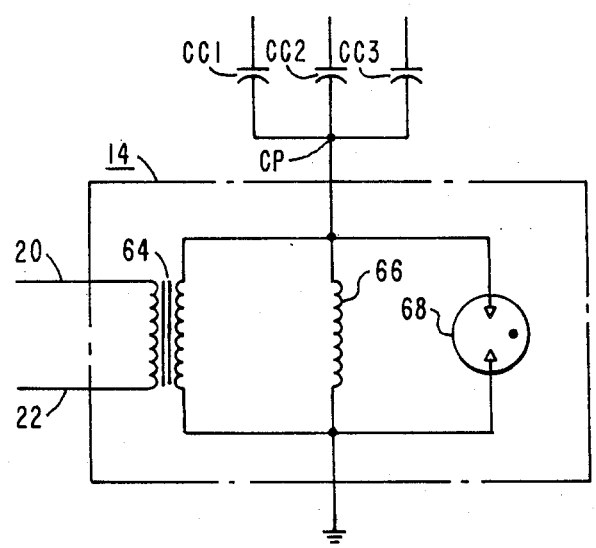
FIG. 3 is a simplified diagram of a signal coupling unit used in conjunction with the preferred embodiment of the present invention.

The signal coupling unit (SCU) as shown in FIG. 3, comprises a signal coupling transformer 64 that provides an output, on lines 20 and 22, to input S3 of the transceiver 12. A drain coil 66 and an arc tube protector 68 are connected in parallel with the signal coupling transformer 64. The input to the signal coupling unit 14 is connected to the common point CP where the three coupling capacitors, CC1, CC2 and CC3, provide coupling between the signal coupling unit 14 and the three phases, $\phi A$, $\phi B$ and $\phi C$, of the power line system 10. The signal coupling unit drain coil 66 performs the function of a high pass filter to eliminate the 60 hz transmission frequency from the signal received at connection point CP. The arc tube protector 68 is used to provide lightning protection for the system. The signal coupling transformer 64 is a carrier current transformer used for the purpose of connecting the high frequency signals to the line.

Figure 4:
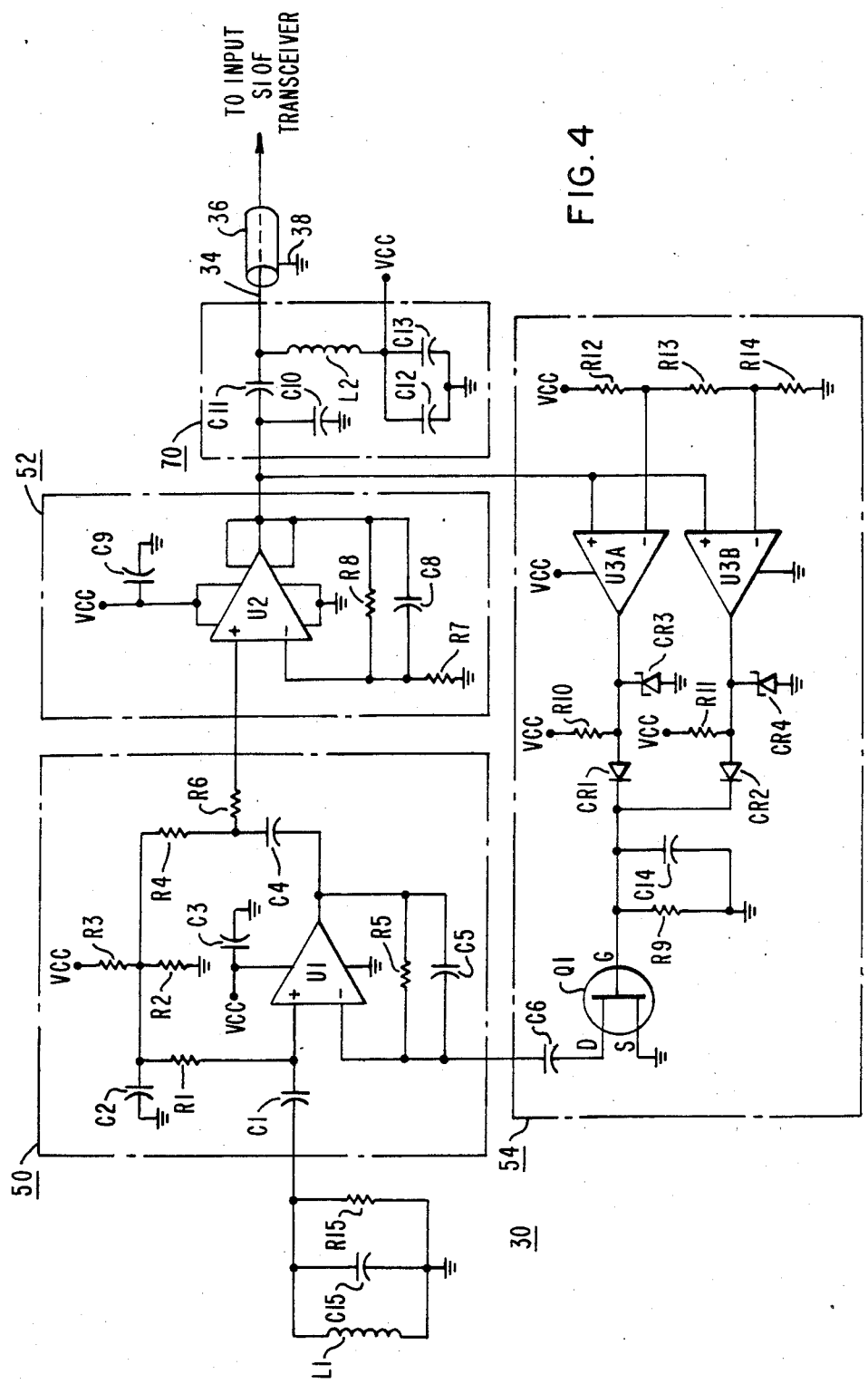
FIG. 4 is a more detailed electrical schematic of the H-field coupler illustrated in FIG. 2.

FIG. 4 illustrates a more detailed schematic of the H-field coupler 30 which is illustrated in FIG. 2. As can be seen in FIG. 4, the H-field coupler 30 comprises the four basic portions illustrated in FIG. 2. The bandpass filter circuitry 50 is connected in signal communication with a coupling inductor L1 which is analogous to the ferrite antenna 32 discussed above. The notch filter and amplifier circuitry 52 is connected in electrical communication with the bandpass filter 50 and its output is connected to a direct current voltage supply with filtering and AC coupling components 70 which is functionally similar to the high frequency isolation coil 56 and DC supply VDC illustrated in FIG. 2. The automatic gain control circuitry 54 is also illustrated in FIG. 4. The dashed boxes are used in conjunction with FIG. 4 to isolate the particular electronic components utilized to perform the functions that are illustrated in the simplified diagram of FIG. 2. The output from the H-field coupler 30 is connected to a coaxial cable whose central conductor 34 and shield 36 provide a signal to the input S1 of the transceiver 12.

Between the bandpass filter 50 and the inductor L1, which is functionally similar to the ferrite antenna 32, capacitor C15 and resistor R15 provide input filtering between the ferrite antenna 32 and the bandpass filter 50. In a particular application of the present invention for use with a carrier frequency of 12.5 khz, resistor R15 has a value of 3.3 K$\Omega$ and the capacitor C15 has a value of 0.027 $\mu$F. However, it should be understood that, for alternative frequencies, different component values would be chosen. The values of the other components shown in FIG. 4 are described in Table I below. However, it should be understood that these component values represent those used in a particular prototype of the present invention and should not be considered to limit its scope.

TABLE I

| Reference | Type or Value | |
|---|---|---|
| L1 | 6 mh | (Ferrite antenna) |
| L2 | 25 mh | |
| R1 | 100 K$\Omega$ | |
| R2 | 27 K$\Omega$ | |
| R3 | 27 K$\Omega$ | |
| R4 | 5.6 K$\Omega$ | |
| R5 | 20 K$\Omega$ | |
| R6 | 27 K$\Omega$ | |
| R7 | 1 K$\Omega$ | |
| R8 | 10 K$\Omega$ | |
| R9 | 2 M$\Omega$ | |
| R10 | 20 K$\Omega$ | |
| R11 | 20 K$\Omega$ | |
| R12 | 4.7 K$\Omega$ | |
| R13 | 12 K$\Omega$ | |
| R14 | 4.7 K$\Omega$ | |
| R15 | 3.3 K$\Omega$ | |
| C1 | .001 MFD | |
| C2 | 1 MFD | |
| C3 | .1 MFD | |
| C4 | .01 MFD | |
| C5 | 100 pf | |
| C6 | .1 MFD | |
| C8 | 10 pf | |
| C9 | .1 MFD | |
| C10 | .047 MFD | |
| C11 | 1 MFD | |
| C12 | 68 MFD | |
| C13 | .1 MFD | |

TABLE I-continued

| Reference | Type or Value |
| --- | --- |
| C14 | .1 MFD |
| C15 | .027 μF |
| C16 | .056 MFD |
| U1 | CA3140E |
| U2 | SE540L |
| U3A | MC3302 |
| U3B | MC3302 |
| Q1 | J270 |
| CR1 | 1N4148 |
| CR2 | 1N4148 |
| CR3 | 1N4370 |
| CR4 | 1N4370 |
| CC1 | .64 μf (15 kv, 150 kv BIL) |
| CC2 | .64 μf (15 kv, 150 kv BIL) |
| CC3 | .64 μf (15 kv, 150 kv BIL) |

Referring again to FIGS. 5A and 5B, it should be apparent that the voltage signal 40 is the signal that is detected by the signal coupling unit 14 that is connected to the primary conductors, φA, φB and φC, of the power line 10 by coupling capacitors, CC1, CC2 and CC3. It should also be apparent that the current signal 42 is the signal detected by the ferrite antenna 32 and the associated H-field coupler 30.

As described above the particular point along the power transmission line where the transceiver 12 is connected to the power line 10 will determine the voltage and current signal strengths in situations where a standing wave phenomenon is being experienced. The present invention, as illustrated in FIG. 1, permits a transceiver 12 to be connected to the power line 10 in such a way that the transceiver 12 receives both voltage and current inputs. This configuration permits the transceiver to select the strongest of the two signals for purposes of demodulation. For example, if the transceiver 12 is connected to a point P1 along the power transmission line, as indicated in FIGS. 5A and 5B, the voltage signal 40 would be extremely low and probably not sufficient to provide a proper signal for demodulation purposes. However, at point P1, the current signal strength is at its maximum magnitude and a signal received at input S1 of the transceiver 12 from the H-field coupler 30 will provide a signal with sufficient magnitude for demodulation purposes.

Referring again to FIG. 6, the solid line represents the portions of the voltage 40 and current 42 signals that would be selected by the transceiver logic. Depending on the particular location along the power transmission line where the transceiver 12 is connected, either the voltage or current signals will be selected based on their relative magnitudes. As clearly illustrated by the solid line in FIG. 6, the present invention provides a signal strength, for the transceiver 12, that is always at least 70.71% of the maximum signal strength available. Although it should be apparent that signal losses will occur between the connection points of the power line system 10 and the transceiver 12 of the present invention, the present invention provides sufficient input signals to the transceiver regardless of the particular location along a power transmission line where the transceiver 12 is connected.

The present invention provides a power line communication device that permits a transceiver to be connected in signal communication with a power line system. A preferred embodiment of the present invention utilizes coupling capacitors to connect a common point to each of the three phases of the power line system. This common point is connected, through a signal coupling unit, to an input of a transceiver. This configuration provides a voltage signal to the transceiver. The present invention can also be connected in signal communication to the neutral lead of a three-phase power line system by an H-field coupler utilizing a ferrite core antenna. When both an H-field coupler and the signal coupling unit are connected to a transceiver, each of these devices can be connected to individual inputs of the transceiver in order to provide two signals from which the transceiver logic can select the signal with the highest magnitude for purposes of demodulation. Although the present invention has been described with significant specificity and the preferred embodiment of the present invention has been discussed and illustrated in great detail, it should not be considered to be so limited. Alternative embodiments of the present invention should be considered to be within its scope.

What I claim is:

1. A transceiver for use with a three phase power line communication system, comprising:
    a receiver having a first input connectable in signal communication with all three phases of said three phase power line and a second input connectable in signal communication with a neutral conductor of said three phase power line;
    first means for coupling voltage signals from said three phases to said first input;
    second means for coupling a current signal from said neutral conductor to said second input;
    means for forming a first voltage signal from said voltage signals from said three phases, said forming means being connected in signal communication with said three phase power line and said first input;
    means for selecting one of said first voltage signal and said current signal, said selecting means being connected in signal communication with said first and second inputs;
    means for demodulating said selected signal, said demodulating means being connected in signal communication with said selected means; and
    a transmitter having an output that is connectable in signal communication with said three phases of said power line.

2. The transceiver of claim 1, wherein:
said first coupling means comprises three capacitors, each of said three capacitors being operatively associated with one of said three phases of said power line.

3. The transceiver of claim 1, wherein:
said demodulator comprises a microprocessor.

* * * * *